Nov. 12, 1957 G. W. DAHL 2,812,777
DIAPHRAGM MOUNTING IN VALVE BODY
Filed Nov. 20, 1953
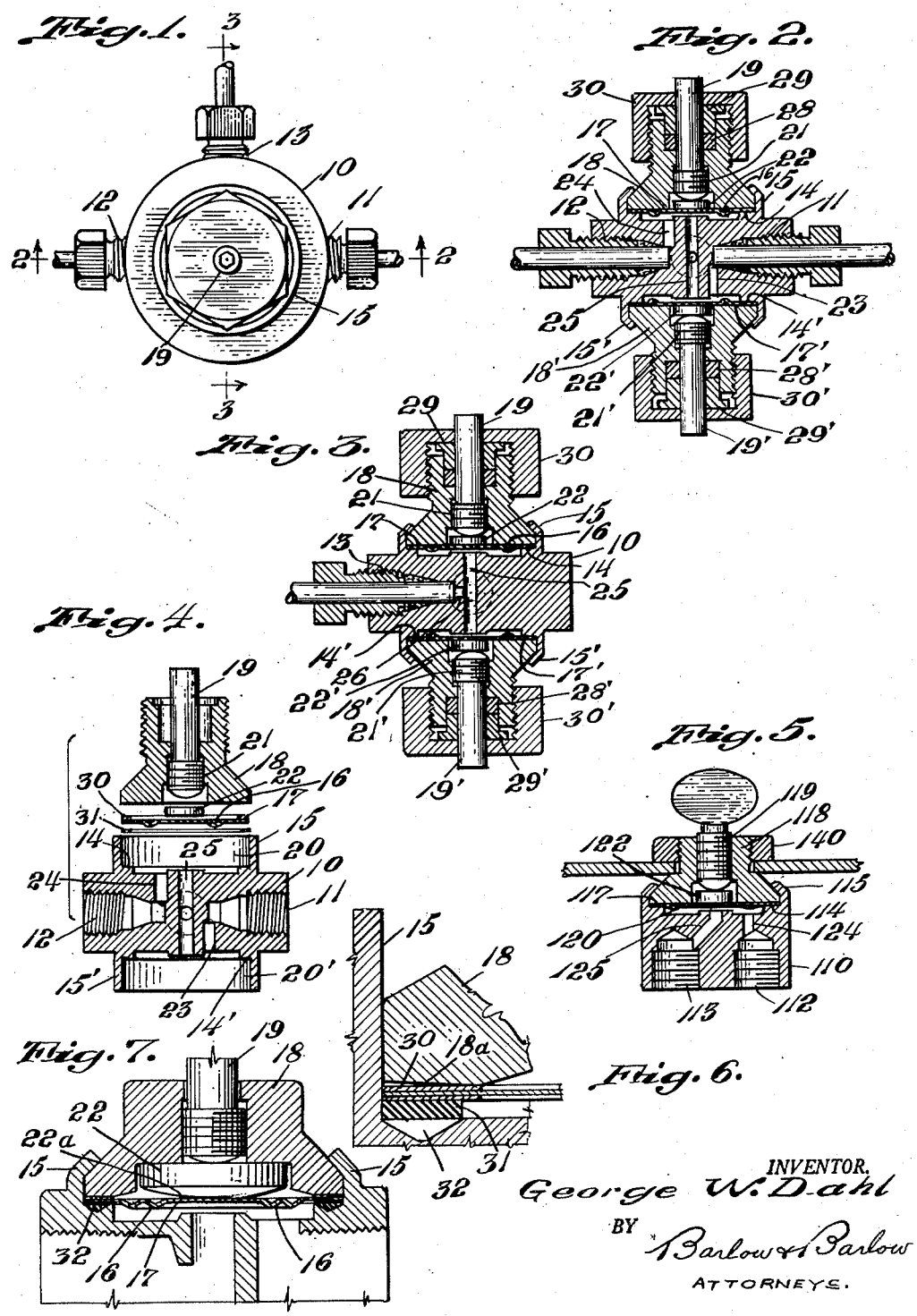
INVENTOR.
George W. Dahl
BY Barlow & Barlow
ATTORNEYS.

2,812,777
DIAPHRAGM MOUNTING IN VALVE BODY

George W. Dahl, Barrington, R. I.

Application November 20, 1953, Serial No. 393,257

3 Claims. (Cl. 137—791)

This invention relates to a valve and more particularly a small packless valve.

Valves as such have taken various forms and have a multitude of uses. One of the major problems, however, confronting the engineer is to find a valve which will withstand the pressures and temperatures used in industry today.

It is, therefore, an object of this invention to provide a valve, the parts of which are so constructed and assembled as to permit utilization in high pressure and high temperature control functions.

It is a further object of this invention to provide a valve wherein the valve seat is under the control of a valve stem and which will be opened by the spring tension in the diaphragm and the pressure of the supply line when the valve stem is released.

A still further object is to provide a valve utilizing a flexible diaphragm as the throttle member.

A still further object is to utilize the diaphragm as part of a seal between the main body of the valve and the valve stem bonnet.

With these and other objects in view, the invention consists of certain novel features of construction as will be more fully described and particularly pointed out in the appended claims.

In the accompanying drawings:

Figure 1 is a top view of a valve of one embodiment of my invention;

Figure 2 is a sectional view taken on line 2—2 of Figure 1;

Figure 3 is a sectional view taken on line 3—3 of Figure 1;

Figure 4 is an exploded sectional view of the valve of Figure 1 showing the manner in which the parts are assembled;

Figure 5 is a sectional view of a single valve forming the essence of this invention which is adapted for panel mounting;

Figure 6 is an enlarged partial sectional view of a portion of the valve bonnet seal; and Figure 7 is a partial sectional view of a preferred configuration of the valve thrust button and associated parts.

In proceeding with this invention, I provide a body member and suitably drill it to form ports and passageways. I further provide a number of diaphragms, thrust buttons, valve stems, and valve bonnets to receive the valve stems which close a designated number of passageways in the valve body.

With reference to Figures 1 to 4 of the drawings, 10 generally designates the valve body and 11, 12, and 13 the ports therein. The valve body is provided with two recesses 20, 20' which have shoulders 14, 14' and upstanding walls 15, 15'. Seated upon shoulders 14, 14' are flexible diaphragms 17, 17' which are preferably made of stainless steel with corrugated circular portions 16. Resting upon the diaphragms 17, 17' are valve bonnets 18, 18' which carry valve stems 19, 19' threaded therein as at 21, 21'. To prevent damage to the diaphragm, there are provided thrust buttons 22, 22' between the valve stems and the diaphragms. In the particular embodiment shown in Figures 1 to 4 port 11 communicates with the recess 20' through a passageway 23 and port 12 communicates with recess 20 via passageway 24. Common to the two recesses 20 and 20' there is provided a passageway 25 which continues as at 26 to port 13. At the ends of this passageway 25 the surrounding stock provides a valve seat for engagement of the diaphragm which when forced into engagement therewith by stem 19 closes communication from one port 11 or 12 to the common port 13.

In the embodiment of Figures 1 to 4, it will be seen that I have provided one port which is a common outlet from the two remaining ports. The flow to this common port may be controlled by the two valves whose diaphragms 17 and 17' serve to control the flow from ports 12 and 11. Should the diaphragm 17 break, the valve stems 19 may be provided with a seal which may take the form of a packing 28, 28' of Teflon or other suitable material, follower bushings 29, 29', and bonnet nuts 30, 30' which are adapted to thread on to the bonnets 18, 18' compressing the packings 28, 28' through the followers 29, 29'. In all applications it is not necessary to provide this safety feature of an additional packing around the valve stem, and thus it is understood that this may be eliminated if so desired.

Referring now to Figures 4, 6, and 7, I show one of my valves in broken and enlarged section. It will be seen that the seal between the bonnet 18 and the shoulder 14 of the housing 10 comprises the diaphragm 17 and two gaskets 30, 31. As shown in Figure 6, the shoulder 14 is preferably provided with a V-shaped recess 32 into which the gasket 31 is forced during the forging of the walls 15. Bonnet 18 is provided with a tapered rim portion 18a which is angled so as to urge gasket 30 outwardly as pressure is exerted thereon when the bonnet 18 is forged on the housing. Figure 7 shows the completed body wherein the generally rectangular gasket 31 has been forced completely into the recess 32 and the gasket 30 has been compressed. Tests have disclosed that this particular construction will withstand pressures far in excess of the valve types which employ flanges which bolt the bonnet to the body or those in which the valve bonnet is threaded into the valve body. This effect is due to the arrangement of the gaskets 30, 31 on either side of the diaphragm 17, two sealing ridges of extreme pressure being afforded by gasket 31 seated in the V-recess 32 and a circumferential seal being afforded by gasket 30 which firmly abuts the walls 15, the entire structure being forged together.

Referring now to Figure 5 wherein like parts to the embodiment of Figures 1 to 4 bear like reference numerals in the one hundred series, I provide a valve body 110 having an inlet passage 112 and an outlet passage 113. In the valve body there is provided an annular recess 120 which is connected to the inlet passage 112 through a bore 124 and to the outlet passage 113 by a bore 125. The valve body 110 is provided with upstanding walls 115 which serve to define the recess 120. Disposed within the recess 120 is an annular shoulder 114 upon which a valve diaphragm 117 is seated. The valve bonnet 118 is provided with a valve stem 119 threaded therein and a mounting nut 140 which is adapted to panel mount the valve structure. Walls 115 of the valve body are forged over the valve bonnet 118, the valve diaphragm 117 being sealed between the valve bonnet and the valve body by gaskets such as 30 and 31 (Figures 6 and 7) which due to the scale of the drawing are not visible. Between the valve stem 119 and the diaphragm 117 there may be provided a thrust button 122 which serves to prevent a torsional force from being transmitted from the valve stem to the valve diaphragm. While I have shown the inlet and outlet ports in this embodiment opening in one direction, it is to be understood that one or both of the ports may open laterally from the valve body.

Referring again to Figure 7, I have additionally shown therein a preferred construction of the thrust button 22 which is provided with a convex diaphragm engaging surface 22a. This surface affords a relatively large area of contact for the diaphragm 17 so that the corrugations 17a and the portion immediately inward of the bonnet seal are not stressed to such a great degree, a more gradual curvature being given the diaphragm.

I claim:

1. In a valve having a body provided with an annular recess having an annular groove and a wall at the outer edge of the said groove, a compressible gasket in said groove, a diaphragm extending transversely of said body and having an annular marginal edge portion in said recess superimposed on said gasket, a second gasket in said recess lying over said diaphragm, a bonnet having a flange positioned in said recess with the inner end wall thereof engaged against said second gasket, said wall about said recess being upset against said flange in clamping relation therewith, said gaskets, end wall and groove extending in fluid tight sealing relation with each other, said end wall being inverted frusto-conical shaped to force the said gaskets outwardly against said recess wall in fluid tight sealing relation therewith.

2. In a valve having a body provided with an annular recess having an annular V-shaped groove and a wall at the outer edge of the said groove, a compressible gasket in said groove, a diaphragm extending transversely of said body and having an annular marginal edge portion in said recess superimposed on said gasket, a second gasket in said recess lying over said diaphragm, a bonnet having a flange positioned in said recess with the inner end wall thereof engaged against said second gasket, said wall about said recess being upset against said flange in clamping relation therewith, said gaskets, end wall and groove extending in fluid tight sealing relation with each other, said end wall being inverted frusto-conical shaped to force the said gaskets outwardly against said recess wall in fluid tight sealing relation therewith.

3. A valve structure as in claim 1 wherein the compressible gasket in the V-shaped groove is initially of rectangular cross section so that when the bonnet is forced against the diaphragm, there will occur two annular areas where the gasket is under extreme compression.

References Cited in the file of this patent

UNITED STATES PATENTS

| | | |
|---|---|---|
| 597,445 | Toof | Jan. 18, 1898 |
| 1,844,528 | Smith | Feb. 9, 1932 |
| 1,859,834 | May | May 24, 1932 |
| 2,095,789 | Bucknam | Oct. 12, 1937 |
| 2,405,466 | Tabb | Aug. 6, 1946 |
| 2,414,196 | Geldhof | Jan. 14, 1947 |
| 2,502,630 | Morrison | Apr. 4, 1950 |
| 2,619,986 | Goepfrich | Dec. 2, 1952 |
| 2,648,351 | Curtis | Aug. 11, 1953 |
| 2,658,711 | Anderson | Nov. 10, 1953 |
| 2,659,565 | Johnson | Nov. 17, 1953 |
| 2,661,767 | Lamb | Dec. 8, 1953 |